(12) United States Patent
Ellis

(10) Patent No.: US 8,784,508 B2
(45) Date of Patent: Jul. 22, 2014

(54) FABRIC PRETREATMENT FOR INKJET PRINTING

(75) Inventor: Scott W. Ellis, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 870 days.

(21) Appl. No.: 11/521,991

(22) Filed: Sep. 15, 2006

(65) Prior Publication Data

US 2007/0067928 A1    Mar. 29, 2007

Related U.S. Application Data

(60) Provisional application No. 60/717,439, filed on Sep. 15, 2005.

(51) Int. Cl.
| | |
|---|---|
| *D06P 5/30* | (2006.01) |
| *D06P 1/673* | (2006.01) |
| *D06P 1/00* | (2006.01) |
| *C09D 11/00* | (2014.01) |
| *D06P 3/60* | (2006.01) |

(52) U.S. Cl.
CPC .......... *C09D 11/322* (2013.01); *D06P 1/67341* (2013.01); *D06P 1/002* (2013.01); *D06P 5/30* (2013.01); *C09D 11/54* (2013.01); *D06P 3/60* (2013.01); *D06P 1/67333* (2013.01)
USPC .............................................. 8/445; 427/412

(58) Field of Classification Search
USPC ............................................................ 8/445
See application file for complete search history.

(56) References Cited

U.S. PATENT DOCUMENTS

| | | | |
|---|---|---|---|
| 4,630,076 A | 12/1986 | Yoshimura | |
| 5,686,951 A | 11/1997 | Koike et al. | |
| 7,104,643 B2 | 9/2006 | Glass et al. | |
| 7,134,749 B2 | 11/2006 | Ben-Zur et al. | |
| 2002/0055599 A1* | 5/2002 | Slone | 526/286 |
| 2002/0132541 A1* | 9/2002 | Vogt et al. | 442/64 |
| 2003/0103129 A1* | 6/2003 | Tanaka et al. | 347/105 |
| 2003/0160851 A1 | 8/2003 | Baccay et al. | |
| 2003/0224680 A1* | 12/2003 | Cates et al. | 442/79 |
| 2004/0043702 A1 | 3/2004 | Singh | |
| 2004/0146544 A1 | 7/2004 | Vyakamam et al. | |
| 2004/0172773 A1* | 9/2004 | Kang et al. | 8/478 |
| 2004/0187715 A1* | 9/2004 | Niimi | 101/114 |
| 2004/0252173 A1* | 12/2004 | Ben-Zur et al. | 347/101 |
| 2005/0084614 A1* | 4/2005 | Bagwell et al. | 427/299 |
| 2005/0146544 A1 | 7/2005 | Kondo | |
| 2005/0182154 A1 | 8/2005 | Berge et al. | |
| 2005/0264632 A1 | 12/2005 | Glass et al. | |
| 2005/0282928 A1* | 12/2005 | Lin et al. | 523/160 |
| 2006/0162586 A1* | 7/2006 | Fresener et al. | 101/115 |
| 2007/0056118 A1 | 3/2007 | Ellis | |
| 2007/0060670 A1 | 3/2007 | Ellis | |
| 2007/0188535 A1 | 8/2007 | Elwakil et al. | |
| 2008/0092309 A1 | 4/2008 | Ellis et al. | |

FOREIGN PATENT DOCUMENTS

| | | |
|---|---|---|
| EP | 1 243 435 A1 | 9/2002 |
| JP | 61-215787 | 9/1986 |
| JP | 63-299970 | 7/1988 |
| JP | 06-108376 A | 4/1994 |
| JP | 11-38864 A | 5/1999 |
| WO | WO 02/11994 A1 | 2/2002 |

OTHER PUBLICATIONS

Copending U.S. Appl. No. 11/521,992.*
Masataka Kawaguchi, Patent Examiner, in JP 2008-531368, the Japanese counterpart application to the present application, Japan Patent Office, Oct. 4, 2011, English Translation of Official Notice of Rejection.
U.S. Appl. No. 11/706,465, Feb. 13, 2007, Elwakil et al.
U.S. Appl. No. 11/521,855, Sep. 15, 2006, Ellis.
U.S. Appl. No. 11/521,693, Sep. 15, 2006, Ellis.
U.S. Appl. No. 11/521,992, Sep. 15, 2006, Ellis et al.
PCT International Search Report and Written Opinion for International Application No. PCT/US2006/036076 dated Feb. 13, 2007.

* cited by examiner

*Primary Examiner* — Harold Pyon
*Assistant Examiner* — Katie L Hammer
(74) *Attorney, Agent, or Firm* — John H. Lamming

(57) ABSTRACT

This invention pertains to a method of inkjet printing on fabric, comprising the steps of pretreatment, printing with a white underprint of substantially the same shape as the colored image and printing an image on the fabric. The preferred digitally printed inks are pigmented inks.

27 Claims, No Drawings

FABRIC PRETREATMENT FOR INKJET PRINTING

CROSS-REFERENCE TO RELATED APPLICATION

This application claims priority under 35 U.S.C. §119 from U.S. Provisional Application Ser. No. 60/717,439, filed Sep. 15, 2005.

BACKGROUND OF THE INVENTION

This invention pertains to inkjet printing on a pretreated fabric with pigmented inkjet inks, and to a pretreatment solution for the fabric that allows high quality printing thereon. It further pertains to inkjet printing on a pretreated fabric using a white pigmented ink in combination with colored inks to produce enhanced colored images. The colored ink is printed on the white ink within 60 minutes of the printing of the white ink.

Digital printing methods such as inkjet printing are becoming increasingly important for the printing of textiles and offer a number of potential benefits over conventional printing methods such as screen printing. Digital printing eliminates the set up expense associated with screen preparation and can potentially enable cost effective short run production. Inkjet printing furthermore allows visual effects such as tonal gradients and infinite pattern repeat sizes that cannot be practically achieved with a screen printing process.

US2004/0252173 describes a digital printing process that utilizes a white ink under a printed image, but the white ink underprinted portion is an white masking layer for the colored ink. US2006/0162586 describes screen printing a underbase which is a white opaque image prior to printing the digitally printed color image. WO2004/043702 describes printing a white underlayer, but suggests drying of the white ink and that the inks are non aqueous. US2005/0146544 a white ink composition with polymerizable components, requires UV light to cure the ink, and is described for use on transparent media.

While digital printing provides a breadth of available printing conditions for almost any fabric, there is often a need for achieving a higher color on the fabric especially colored textiles. It is an object of this invention to enable higher color, high quality inkjet printing of fabrics, such as cotton and cotton blends, with colored inkjet inks.

SUMMARY OF THE INVENTION

In one aspect, the present invention relates to a method of digitally printing a colored image on a textile such as a white or colored textile, comprising the steps of:

a) pretreating the textile with a pretreatment solution comprising an aqueous multivalent cationic salt solution b) digitally printing the pretreated textile with an aqueous white pigmented ink jet ink, where the white printed area is substantially the same shape as the printed colored image that is next applied, c) digitally printing the colored image on the white ink with one or more aqueous colored ink jet inks, where the time interval between the first printing of the white ink and the first printing of the colored ink jet inks is less than about 60 minutes, and where optionally the amount of white ink used to print the image is not uniform.

The steps described above of digitally printing of the white layer and the colored image layer are preferably performed using an inkjet printer.

The present invention pertains, in another aspect, to a fabric that has been pretreated with an aqueous multivalent cationic salt solution, wherein the multivalent cationic salt is a calcium salt selected from the group consisting of calcium nitrate, calcium nitrate hydrate and mixtures thereof. The present invention further pertains to a fabric that has been pretreated with a nonionic latex polymer, either as an additive to the multivalent cationic salt solution or as a separate pretreatment solution. The present invention also pertains to a fabric printed with a colored ink by the method described above. The fabric may be colored or white, but it is preferably colored.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references to in the singular may also include the plural (for example, "a" and "an" may refer to one, or one or more) unless the context specifically states otherwise.

DETAILED DESCRIPTION OF THE PREFERRED EMBODIMENTS

Nonuniform Image

It is known that the digitally printed white inkjet inks can be favorably used for printing on colored and/or clear substrates. In general, the white ink is often used to create a uniform underlayer for the printed image. In fact, other printing techniques such as screen printing may be used to create the uniform white underlayer. In contrast to a uniform underlayer, the instant invention can optionally have a non-uniform underlayer. The non-uniformity is dictated by the image itself, that is, parts of the colored image may be enhanced by having less white digitally printed ink in portions of the underlayer. That is, the white opacity of the inventive underlayer may not be uniform throughout the image. Another way to describe this phenomenon is that the underlayer has varying intensities of the white underlayer printed prior to the printing of the digitally printed colored inks on top of the white ink. Since there may be different intensities of the white, all of the underlayer is not an opaque masking layer.

In addition to a white underlayer which is substantially the same shape as the underlayer image, the white printed area may extend beyond the largest dimensions of the image. In the case of an oval image, a white rectangle may be printed which is larger than the oval image. This larger white area creates contrast from the preferably colored textile substrate.

Time Interval

The digitally printed colored inks must be printed within about 60 minutes of the white ink, when characterized as the time from the first white ink bring digitally printed to the time when the first colored ink is put down. The white underlayer in the present invention cannot be cured by heating, or otherwise cured prior to the printing of the colored inks.

Pretreatment Solution

The pretreatment solution used in the method of the present invention is an aqueous multivalent cationic salt solution. More preferably, the preteatment solution comprises a solution of a multivalent cationic salt in water. Optionally, other ingredients can be added. Including nonionic latex polymers Ingredient percentages mentioned herein after are weight percent based on the total weight of the final solution, unless otherwise indicated.

Multivalent Cation

The pretreatments of this invention comprise one or more multivalent cations. The effective amounts needed in a particular situation can vary, and some adjustment, as provided for herein, will generally be necessary.

"Multivalent" indicates an oxidation state of two or more and, for an element "Z", are typically described as $Z^{2+}$, $Z^{3+}$, $Z^{4+}$ and so forth. For brevity, multivalent cations may be referred to herein as $Z^x$. The multivalent cations are substantially soluble in the aqueous pretreatment solution and preferably exist (in solution) in a substantially ionized state so that they are in a form where they are free and available to interact with textile when the textile is exposed to the pretreatment solution.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. In another embodiment, the multivalent cation comprises at least one of Ca, Ba, Ru, Co, Zn and Ga. In yet another embodiment, the multivalent cation comprises at least one of Ca, Ba, Ru, Co, Zn and Ga. Preferably the multivalent cation is Ca.

$Z^x$ can be incorporated into pretreatment solution by addition in a salt form or by addition in an alkaline form and used as a base in the adjustment of the pretreatment solution pH.

The associated anionic material can be chosen from any common anionic material, especially halides, nitrates and sulfates. The anionic form is chosen so that the multivalent cation is soluble in the aqueous pretreatment solution. The multivalent cationic salts can be used in their hydrated form.

For Ca, the preferred multivalent cation salts are calcium chloride, calcium nitrate, calcium nitrate hydrate and mixtures thereof. Particularly preferred are calcium nitrate, calcium nitrate hydrate and mixtures thereof.

Other optional ingredients in the pretreatment solution may include, but are not limited to, humectants and biocides. Biocides prevent microbial degradation—their selection and use is generally well known in the art. Suitable humectants are the same as those suitable for use in pigmented inkjet inks, as discussed in further detail below.

The balance of the pretreatment solution is water. A pretreatment solution consisting essentially of a solution of a multivalent cationic salt in water is particularly suitable.

The solution should comprise sufficient multivalent cation content and other ingredients to provide adequate infusion and/or coating of the textile with the multivalent cation. Typically, the pretreatment will comprise at least about 0.5 wt % of the multivalent cation salt, and amounts can be used up to the solubility limits of the particularly multivalent cation salt or salts utilized. Preferably, the pretreatment will comprise from about 1.0 wt % to about 30 wt % of the multivalent cation salt.

In another embodiment of the present invention, the pretreatments or formulations for the particular textile substrates, may also include a nonionic polymer in order to further enhance the adhesion and/or waterfastness of colorants on the textile fabric substrates. It has been found that pretreated textiles including a nonionic polymer provide high color density and saturation relative to untreated textiles, superior print quality relative to untreated textiles, reduction of wicking or bleeding relative to untreated textiles, and enhanced ink absorption relative to untreated textiles. Furthermore, the pretreatment formulations provide a waterfast printed image when printing via an ink jet printing process. By way of example only, the nonionic materials may include vinylacetate, ethylene-vinylacetate, acrylate, styrene, and styrene-acrylate resins and other nonionic latexes.

The preferred use of the nonionic polymer is that it is added to the multivalent cationic salt solution. The nonionic polymer/ multivalent cationic salt solution must be stable as a solution or as a stable emulsion to permit the treatment of the fabric. If the nonionic polymer gels, or its emulsion is not stable in the presence of the multivalent cationic salt solution, than it cannot be used as a pretreatment additive.

When the optional non ionic polymer is used in the pretreatment, it can be utilized as a separate pretreatment solution or combined with the multivalent cationic solution described above.

Fabric

The fabric to be pretreated can be any fabric suitable for printing with white and colored inkjet inks, and is preferably a fabric comprising cotton and/or cotton blends.

The fabric can be a white or colored fabric. "Colored" fabric as used herein means non-white, including, without limitation, dark colored fabrics including black.

Pretreatment of the Fabric

Application of the pretreatment to the fabric can be any convenient method and such methods are generally well-known in the art. One example is an application method referred to as padding. In padding, a fabric is dipped in the pretreatment solution, then the saturated fabric is passed through nip rollers that squeeze out the excess solution. The amount of solution retained in the fabric can be regulated by the nip pressure applied by the rollers. Other pretreatment techniques include spray application wherein the solution is applied by spraying on the face or face and back of the fabric. Spraying can be limited to the digitally printed area of the printed fabric. An example of where this limited spraying would be particularly applicable is in the digital printing of an image on preformed textile articles such as, for example, a T-shirts, caps, undergarments and like clothing articles.

Preferably, the pretreatment solution is applied to the fabric in a wet pick-up of from about 0.20 to about 7.5 grams of multivalent cationic (calcium) salt per 100 grams of fabric, more preferably from about 0.60 to about 6.0 grams of multivalent cationic (calcium) salt per 100 grams of fabric, and still more preferably from about 0.75 to about 5.0 grams of multivalent cationic (calcium) salt per 100 grams of fabric.

Optionally, the pretreatment solution contains nonionic latex polymers and is applied to the fabric in a wet pick-up of from about 0.20 to about 7.5 grams of nonionic latex polymers per 100 grams of fabric, more preferably from about 0.60 to about 6.0 grams of nonionic latex polymers per 100 grams of fabric, and still more preferably from about 0.75 to about 5.0 grams of nonionic latex polymers per 100 grams of fabric.

After application of pretreatment, the fabric may be dried in any convenient manner. The fabric is preferably substantially dry at the time of printing, such that the final percent moisture is (approximately) equal to the equilibrium moisture of the pretreated fabric at ambient temperature. The absolute amount of moisture in the fabric, of course, can vary somewhat depending on the relative humidity of the surrounding air.

The multivalent salts remaining in the fabric after drying provide an interactive material that will interact with the inkjet inks during printing. It will be appreciated that sufficient multivalent salts must be present to effect a brighter/ more colorful image. Routine optimization will reveal appropriate multivalent salt levels for a given printer and pigmented ink or ink set.

Pigmented White Ink

The preferred pigment for the aqueous pigmented white ink is titanium dioxide. Titanium dioxide ($TiO_2$) pigment useful in the present invention may be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the ink.

The titanium dioxide pigment is in and of itself white in color.

For applications demanding high hiding or decorative printing applications, the titanium dioxide particles preferably have an average size of less than about 1 micron (1000 nanometers). Preferably, the particles have an average size of from about 50 to about 950 nanometers, more preferably from about 75 to about 750 nanometers, and still more preferably from about 100 to about 500 nanometers. These titanium dioxide particles are commonly called pigmentary $TiO_2$.

For applications demanding white color with some degree of transparency, the pigment preference is "nano" titanium dioxide. "Nano" titanium dioxide particles typically have an average size ranging from about 10 to about 200 nanometers, preferably from about 20 to about 150 nanometers, and more preferably from about 35 to about 75 nanometers. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TiO_2$. One preferred embodiment of this invention utilizes a such combination.

The titanium dioxide is preferably incorporated into an ink formulation via a slurry concentrate composition. The amount of titanium dioxide present in the slurry composition is preferably from about 15 wt % to about 80 wt %, based on the total slurry weight. For slurries wherein the majority of titanium dioxide particles are of a pigmentary size, and preferably those in which the average particle size is greater than about 200 nanometers up to about 1 micron, the amount of titanium dioxide in the slurry is preferably from about 50 wt % to about 75 wt %, based on the total weight of the slurry. For slurries wherein the majority of titanium dioxide particles are of "nano" size, and preferably those in which the average particle size is from about 10 nanometers to about 200 nanometers, the amount of titanium dioxide in the slurry is preferably from about 20 wt % to about 50 wt %, and more preferably from about 25 wt % to about 35 wt %, based on the weight of the slurry.

The titanium dioxide pigment may be substantially pure titanium dioxide or may contain other metal oxides, such as silica, alumina and zirconia. Other metal oxides may become incorporated into the pigment particles, for example, by co-oxidizing or co-precipitating titanium compounds with other metal compounds. If co-oxidized or co-precipitated metals are present, they are preferably present as the metal oxide in an amount from about 0.1 wt % to about 20 wt %, more preferably from about 0.5 wt % to about 5 wt %, and still more preferably from about 0.5 wt % to about 1.5 wt %, based on the total titanium dioxide pigment weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. Such coatings may optionally be present in an amount of from about 0.1 wt % to about 10 wt %, and preferably from about 0.5 wt % to about 3 wt %, based on the total weight of the titanium dioxide pigment. These coatings can provide improved properties including reducing the photoreactivity of the titanium dioxide. Commercial examples of such coated titanium dioxides include R700 (alumina-coated, available from E.I. DuPont de Nemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

The titanium dioxide pigment may also bear one or more organic surface coatings, such as, for example, carboxylic acids, silanes, siloxanes and hydrocarbon waxes, and their reaction products with the titanium dioxide surface. The amount of organic surface coating, when present, generally ranges from about 0.01 wt % to about 6 wt %, preferably from about 0.1 wt % to about 3 wt %, more preferably about 0.5 wt % to about 1.5 wt %, and still more preferably about 1 wt %, based on the total weight of the pigment.

Dispersants

One or more dispersants are employed in the present ink jet inks to stabilize the titanium dioxide. The dispersants are added to a titanium dioxide and this mixture is subject to dispersive forces to achieve a stable dispersion (slurry). This dispersion in turn is used to prepare the ink formulation.

Dispersants can be soluble or dispersed polymer(s). They can be any suitable polymer, for example, soluble polymers may include linear homopolymers, copolymers or block polymers; they also can be structured polymers including graft or branched polymers, stars, dendrimers, etc. The dispersed polymers can include latexes, polyurethane dispersions, etc. The polymers may be made by any known process including but not limited to free radical, group transfer, ionic, RAFT, condensation and other types of polymerization.

The dispersant used to stabilize the pigment is preferably a dispersed polymer. Structured or random polymers may be used, although structured polymers are preferred for use as dispersants for reasons well known in the art. The term "structured polymer" means polymers having a block, branched or graft structure. Examples of structured polymers include AB or BAB block copolymers such as disclosed in U.S. Pat. No. 5,085,698; ABC block copolymers such as disclosed in EP-A-0556649; and graft polymers such as disclosed in U.S. Pat. No. 5,231,131. Other polymeric dispersants that can be used are described, for example, in U.S. Pat. Nos. 6,117,921, 6,262,152, 6,306,994 and 6,433,117. The disclosure of each of these publications is incorporated herein by reference for all purposes as if fully set forth.

Polymer dispersants suitable for use in the present invention generally comprise both hydrophobic and hydrophilic monomers. Some examples of hydrophobic monomers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts such as dimethylaminoethyl(meth)acrylate may be employed.

Preferably, at least one of the dispersant provides anionic stabilization to the titanium dioxide pigment. In such a case, the dispersant applied to the pigment creates an anionic surface charge ("anionic pigment dispersion"). Preferably, that surface charge is imparted predominately by ionizable carboxylic acid (carboxylate) groups.

In a preferred embodiment, a combination of a graft and block copolymers are used as co-dispersants for the titanium dioxide pigment, such as described in U.S. application Ser. No. 10/872,856 (filed Jun. 21, 2004), the disclosure of which is incorporated by reference herein for all purposes as if fully set forth. This combination of dispersants is effective in stabilizing titanium dioxide pigment slurries and, furthermore, provides enhanced stability in the ink formulations. Other preferred titanium dioxide ink jet inks are described in commonly owned U.S. Provisional Appln. Ser. No. 60/717,438, entitled "Aqueous Inkjet Ink", filed on Sep. 15, 2005, the disclosure of which is incorporated by reference herein for all purposes as if fully set forth.

The titanium dioxide dispersion may have other components that will enhance the white ink. These can include zinc oxide, talc and polymeric systems such as Ropaque® opaque polymers. The latter are styrene/acrylic beads available from Rohm and Haas, Philadelphia Pa.

Colored Inkjet Inks

The colorant used for printing the colored image may be a dye or a pigment. Dyes include disperse dyes, reactive dyes, acid dyes and the like. The colored inkjet inks and the white ink are aqueous and do not contain components that are UV curable Pigmented inks are preferred. Pigmented inkjet inks suitable for use in the present method typically comprise a pigment dispersed in a vehicle. The vehicle can be aqueous or non-aqueous, but aqueous vehicles are preferred. Preferably, the pigment ink comprises an anionically stabilized pigment dispersed in an aqueous vehicle.

An "aqueous vehicle" refers to a vehicle comprised of water or a mixture of water and at least one water-soluble organic solvent (co-solvent) or humectant. Selection of a suitable mixture depends on requirements of the specific application, such as desired surface tension and viscosity, the selected colorant, and compatibility with substrate onto which the ink will be printed.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

An aqueous vehicle will typically contain about 30% to about 95% water with the balance (i.e., about 70% to about 5%) being the water-soluble solvent. Ink compositions typically contain about 60% to about 95% water, based on the total weight of the aqueous vehicle.

Pigments suitable for being used with the multivalent pretreatment of the textile are those generally well-known in the art for aqueous inkjet inks. Traditionally, pigments are stabilized by dispersing agents, such as polymeric dispersants or surfactants, to produce a stable dispersion of the pigment in the vehicle. More recently though, so-called "self-dispersible" or "self-dispersing" pigments (hereafter "SDP") have been developed. As the name would imply, SDPs are dispersible in water without dispersants. Dispersed dyes are also considered pigments as they are insoluble in the aqueous inks used herein.

The dispersant or surface treatment applied to the pigment creates an anionic surface charge ("anionic pigment dispersion"). Preferably, that surface charge is imparted predominately by ionizable carboxylic acid (carboxylate) groups.

The pigments which are stabilized by added dispersing agents may be prepared by methods known in the art. It is generally desirable to make the stabilized pigment in a concentrated form. The stabilized pigment is first prepared by premixing the selected pigment(s) and polymeric dispersant(s) in an aqueous carrier medium (such as water and, optionally, a water-miscible solvent), and then dispersing or deflocculating the pigment. The dispersing step may be accomplished in a 2-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia, YTZ and nylon. These various dispersion processes are in a general sense well known in the art, as exemplified by U.S. Pat. Nos. 5,022,592, 5,026,427, 5,310,778, 5,891,231, 5,976, 232 and US20030089277. The disclosures of each of these publications are incorporated by reference herein for all purposes as if fully set forth. Preferred are 2-roll mill, media mill, and by passing the mixture through a plurality of nozzles within a liquid jet interaction chamber at a liquid pressure of at least 5,000 psi.

After the milling process is complete the pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment.

The dispersant used to stabilize the pigment or the disperse dye is preferably a polymeric dispersant. Either structured or random polymers may be used, although structured polymers are preferred for use as dispersants for reasons well known in the art. The term "structured polymer" means polymers having a block, branched or graft structure. Examples of structured polymers include AB or BAB block copolymers such as disclosed in U.S. Pat. No. 5,085,698; ABC block copolymers such as disclosed in EP-A-0556649; and graft polymers such as disclosed in U.S. Pat. No. 5,231,131. Other polymeric dispersants that can be used are described, for example, in U.S. Pat. Nos. 6,117,921, 6,262,152, 6,306,994 and 6,433, 117. The disclosure of each of these publications is incorporated herein by reference for all purposes as if fully set forth.

Polymer dispersants suitable for use in the present invention comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth) acrylate may be employed.

A wide variety of organic and inorganic pigments, alone or in combination, may be selected to make the ink. The term "pigment" as used herein means an insoluble colorant. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is less than about 500 nm, preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in previously incorporated U.S. Pat. No. 5,085,698.

In the case of organic pigments, the ink may contain up to approximately 30%, preferably about 0.1 to about 25%, and more preferably about 0.25 to about 10%, pigment by weight based on the total ink weight. If an inorganic pigment is selected, the ink will tend to contain higher weight percentages of pigment than with comparable inks employing organic pigment, and may be as high as about 75% in some cases, since inorganic pigments generally have higher specific gravities than organic pigments.

Self-dispersed pigments can be used and are often advantageous over traditional dispersant stabilized pigments from the standpoint of greater stability and lower viscosity at the same pigment loading. This can provide greater formulation latitude in final ink.

SDPs, and particularly self-dispersing carbon black pigments, are disclosed in, for example, U.S. Pat. Nos. 2,439, 442, 3,023,118, 3,279,935 and 3,347,632. Additional disclosures of SDPs, methods of making SDPs and/or aqueous inkjet inks formulated with SDP's can be found in, for example, U.S. Pat. Nos. 5,554,739, 5,571,311, 5,609,671, 5,672,198, 5,698,016, 5,707,432, 5,718,746, 5,747,562, 5,749,950, 5,803,959, 5,837,045, 5,846,307, 5,851,280, 5,861,447, 5,885,335, 5,895,522, 5,922,118, 5,928,419, 5,976,233, 6,057,384, 6,099,632, 6,123,759, 6,153,001, 6,221,141, 6,221,142, 6,221,143, 6,281,267, 6,329,446, US2001/0035110, EP-A-1114851, EP-A-1 158030, WO01/1 0963, WO01/25340 and WO01/94476.

In a preferred embodiment, a combination of a graft and block copolymers are used as co-dispersants for the titanium dioxide pigment, such as described in U.S. application Ser. No. 10/872,856 (filed Jun. 21, 2004), the disclosure of which is incorporated by reference herein for all purposes as if fully set forth. This combination of dispersants is effective in stabilizing titanium dioxide pigment slurries and, furthermore, provides enhanced stability in the ink formulations. Other preferred titanium dioxide ink jet inks are described in commonly owned U.S. Provisional Appln. Ser. No. 60/717,438, entitled "Aqueous Inkjet Ink", filed on Sep. 15, 2005, the disclosure of which is incorporated by reference herein for all purposes as if fully set forth.

Additives

Other ingredients (additives) may be formulated into the inkjet ink, to the extent that such other ingredients do not interfere with the stability and jetablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell and Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes. A particularly preferred binder additive is a crosslinked polyurethane as described in US20050182154, the disclosure of which is incorporated by reference herein for all purposes as if fully set forth.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N', N", N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of about 70% to about 99.8%, and more typically about 80% to about 99%. Colorant is generally present in amounts up to about 10%. Percentages are weight percent of the total weight of ink.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic. Preferred pH for the ink is in the range of from about 6.5 to about 8.

During the printing of colored images which include the steps of printing a white underprint image substantially similar to the image of the colored inks, it was observed that the color was enhanced if the printing of the colored inks was followed relatively closely after the white ink was printed. When the first colored inks were printed more than about 60 minutes after the white ink was initially printed, then the colored image was observed to have less color in the image. A preferred time gap between printing the white ink and the colored ink is less than about 30 minutes. A more preferred time gap between printing the white ink and the colored ink is less than about 10 minutes.

While not being bound by theory, there may be some colorant/$TiO_2$ mixing at image surface that enhances the colors. The white printed image is not 'dry' at the time of the colored ink printing which may enhance the mixing. It might be expected that this white/colored image would lead to pastel colors or tonal effects, but in fact the color is enhanced.

Another description of the inventive printing sequence is that the printing is done as a "wet-on-wet" printing process. By the term "wet-on-wet", it is meant that the second set of one or more colored inks are applied to the first white printed image without a curing or drying step between the different jetting of the white and the colored inks.

The amount of white ink used to print the image may not be uniform. That is, the amount of white ink can be put down at a 100% printing intensity under the image, but optionally the white ink can be varied to achieve different color printing enhancements. To get maximum amounts of white ink jetted onto a substrate, a printer may have more than one white ink jet ink. For 100% printing intensity all of the white ink jets are putting down maximum allowed ink.

While the white ink can be printed at one intensity throughout the image, leading to one type of white ink/colored ink interaction, various intensities of the white ink may be printed to optimize the final image. For instance, if an image with black colors in it are being printed on a black textile, then an optional printing approach is to exclude printing the white ink under the black parts of the image. Also, the white ink can be printing at increasing intensity to permit shading in an image, or a white boundary provided for the entire image or parts of the image. For the case where varying amounts of white ink are used for an image, the printing system parameters are adjusted such that less than 100% intensity white ink is provided under some or all of the image.

After the white ink is printed on the substrate, another white ink may be jetted essentially simultaneously with the colored inks to achieve other enhanced color results.

Ink Sets

The term "ink set" refers to all the individual inks or other fluids an inkjet printer is equipped to jet. The white inks used to print the image prior to printing the colored inks or the white ink used to print simultaneously with the colored inks are considered part of the ink set.

In one preferred embodiment, the ink set comprises at least two differently colored inkjet inks, at least one of which is a white pigmented inkjet ink as described above.

In another preferred embodiment, the ink set comprises at least three differently colored inkjet inks, wherein at least one is a cyan inkjet ink, at least one is a magenta inkjet ink, and at least one is a yellow inkjet ink.

In addition to the colored inkjet inks just mentioned, it is also preferable to include a black inkjet ink in the ink set.

In addition to the CMYKW inks mentioned above, the ink sets may contain additional differently colored inks, as well as different strength versions of the CMYKW and other inks.

For example, the inks sets of the present invention can comprise full-strength versions of one or more of the inks in the ink set, as well as "light" versions thereof.

Additional colors for the inkjet ink set include, for example, orange, violet, green, red and/or blue.

The preferred ink sets inks are pigmented inks.

Printinq Method

The present method relates to digitally printing a pretreated textile substrate. Typically, this involves the following steps:

(1) providing an inkjet printer that is responsive to digital data signals;

(2) loading the printer with the textile substrate to be printed, in this case the pretreated textile substrate;

(3) loading the printer with the above-mentioned white inks, inks or inkjet ink sets; and (4) printing onto the substrate using the white inkjet ink followed by the inkjet ink or inkjet ink set in response to the digital data signals.

Printing can be accomplished by any inkjet printer equipped for handling and printing fabric. Commercial printers include, for example, the Dupont™ Artistri™ 3210 and 2020 printers, and the Mimaki TX series of printers.

As indicated above, a variety of inks and ink sets are available for use with these printers. Commercially available ink sets include, for example, DuPont™ Artistri™ P700 and P5000 series inks.

The amount of ink laid down on the fabric can vary by printer model, by print mode (resolution) within a given printer and by the percent coverage need to achieve a given color. The combined effect of all these considerations is grams of ink per unit area of fabric for each color. In one embodiment, ink coverage is preferably from about 5 to about 17 grams of ink per square meter of fabric for colored inks (including black and white inks).

If, however, a white ink is used as a background or a preprinted image matching the colored image for the digitally printed image, up to about ten times more white ink (generally from about 5 to about 300 grams of ink per square meter of fabric) may be used to obtain an enhanced final image. In such case, the white ink is initially printed onto the substrate in at least a portion of the area to be covered by the final image (the underprint portion), then the final image is printed at least over the underprint portion.

The white ink can also be printed outside the boundaries of the final image (either as part of the initial background printing or subsequently as part of the image printing), for example, to generate a small, imperceptible boundary to the image, making the image appear to have a distinct boundary.

The white ink may be printed onto the substrate in at least a portion of the area to be covered by the final image (the underprint portion), then the final image is printed at least over the underprint portion. This condition can be described as a 100% white printing intensity of the white ink under the colored image. Since the white ink is not cured, treated with heat, etc. to drive out the liquid components of the white ink, the image can be considered still a wet underprint portion. The white ink may also be printed in a non- uniform manner, that is some of the underprint portion would have 100% white printing intensity, while other parts of the underprinted portion would have less white printed. Thus, the white underprint can have a nonuniform white ink intensity in the underprinted portion of the image. This is done to achieve improved color images on the digitally printed textile. The software available for commercial textile printers for example, DuPont™ Artistri™ P700 and the Epson 3000 ink jet printer, a Fast T-Jet™ from US Screen Printing Institute (Tempe, Ariz.), can be utilized to vary the amount of the white ink. In the US Screen Printing software the underbase strength (white) is controlled from 0 to 100%. The non uniform printing of the white is controlled by the highlight white between 0 and 100%. This latter feature permits improving the image. Another means of controlling the white ink can be done by modifications to the process described in U.S. Provisional Application Ser. No. 60/773,291, filed Feb. 14, 2006.

In general, the white ink can be printed from a single nozzle or multiple nozzles to put down as much white ink as required to obtain as white an underlayer as is possible. Available white inks which are compatible with inkjet printing systems often do not achieve a white printed image with a single nozzle or printhead. To achieve a white underlayer might approach a white opaque appearance multiple white ink printheads or repeated firings from a single white printhead are needed to achieve the desired effects.

In order to obtain the optional nonuniform underlayer white image, the digitally printing system should not print some of the white drops required for a full uniform coverage the loss of white drops will lead to a nonuniform white underlayer image. Various printing strategies may be used to print the nonuniform white underlay image. 1. fewer drops can be put down in print area. If there are 4 white printheads all putting down white ink drops to obtain maximal white intensity for the white underlayer, than 3 , 2 or 1 of the printheads can be "instructed to fire a white drop" 2. If the printer has a variable drop volume capability the drop volume for any given white drop could be reduced. 3. The concentration of the white pigment can be reduced in one or more of the printheads, leading to less white ink pigment being dropped on the substrate, while maintaining the drop size.

For textile printing equipment, like the Artistri 2020 which has 2 rails each with 8 printheads, the white ink can be put in up to 8 of the printheads on the first rail. The underlayer image maybe printed using maximum amount of white ink from these 8 printheads, or preferable using less ink in parts of the image, creating a nonuniform white underlayer. The nonuniformity is controlled by the software which sends the signals to fire the printheads. The printing software can use the digital information for the image to create a nonuniform white underlayer to optimize the final colored printed image. Then the textile substrate is advanced to position it in relation to the second rail with 8 additional printheads. These 8 printheads will normally have combinations of CMY and other colors needed to optimize printing of colored textiles. Alternatively, a white ink can be in one or more of the second rail printheads and used as color in the printing of the image.

The use of the white ink for printing a background for a digitally printed image is particularly useful when printed onto colored (non-white) textiles.

Post Treatment of Fabric

Fabric printed with pigmented inks will typically be post-treated according to procedures well-known in the textile printing art.

The printed textiles may optionally be post processed with heat and/or pressure, such as disclosed in US20030160851 (the disclosure of which is incorporated by reference herein for all purposes as if fully set forth). Upper temperature is dictated by the tolerance of the particular textile being printed. Lower temperature is determined by the amount of heat needed to achieve the desired level of durability. Generally, fusion temperatures will be at least about 80° C. and preferably at least about 140° C., more preferably at least about 160° C. and most preferably at least about 180° C.

Fusion pressures required to achieve improved durability can be very modest. Thus, pressures can be about 3 psig, preferably at least about 5 psig, more preferrable at least about 8 psig and most preferably at least about 10 psig. Fusion pressures of about 30 psi and above seem to provide no additional benefit to durability, but such pressures are not excluded.

The duration of fusion (amount of time the printed textile is under pressure at the desired temperature) is not believed to be particularly critical. Most of the time in the fusion operation generally involves bringing the print up to the desired temperature. Once the print is fully up to temperature, the time under pressure can be brief (seconds).

EXAMPLES

Printing Conditions

The examples described below were done using an Epson 3000 ink jet printer, a Fast T-Jet™ from US Screen Printing Institute (Tempe, Ariz.), the and prints were made on various substrates. The textile substrates used were Hanes Beefy T 100% cotton t-shirts, Hanes Heavy weight 100% cotton t-shirts, Hanes 50/50 polycotton cotton t-shirts, and a black fabric from Joann's Fabric (woven 100% cotton tweed). All test prints were fused at about 170° C. for about 1 minute.

Colorimetric measurements were done using a Minolta Spectrophotometer CM-3600d using Spectra Match software.

Where indicated the printed textile was tested for washfastness according to methods developed by the American Association of Textile Chemists and Colorists, (AATCC), Research Triangle Park, N.C. The AATCC Test Method 61-1996, "Colorfastness to Laundering, Home and Commercial: Accelerated", was used. In that test, colorfastness is described as "the resistance of a material to change in any of its color characteristics, to transfer of its colorant(s) to adjacent materials or both as a result of the exposure of the material to any environment that might be encountered during the processing, testing, storage or use of the material." Tests 2A and 3A were done and the color washfastness and stain rating were recorded. The ratings for these tests are from 1-5 with 5 being the best result, that is, little or no loss of color and little or no transfer of color to another material, respectively.

Pretreatment Solutions

Reagent grade calcium nitrate tetrahydrate (Aldrich) was mixed with deionized water until the calcium nitrate was completely in solution. Four pretreatment solutions were prepared, and a comparative solution without a multivalent cation present was also prepared.

The optional nonionic polymer additive to the pretreatment solution can be any nonionic polymer additive intended for use as an additive for textile pretreatments. Examples of commercially available nonionic latex polymers include the PrintRite® 592 and Permax® 200 from Noveon, Cleveland Ohio and Airflex® Polymer Emulsions from Air Products, Trexlertown Pa.

TABLE 1

Pretreatment Solutions 1-4

| | Component (Wt %) | |
|---|---|---|
| | as Calcium Nitrate Tetrahydrate | as Calcium Nitrate |
| Pretreatment Solution 1 | 2 | 1.39 |
| Pretreatment Solution 2 | 5 | 3.47 |
| Pretreatment Solution 3 | 10 | 6.95 |
| Pretreatment Solution 4 | 20 | 13.9 |
| Pretreatment Solution 5* | 15 | 10.45 |
| Pretreatment Solution 6** | 15 | 10.45 |
| Comparative Solution | 0.0 | 0.0 |

*Pretreatment Solution 5 contains 10% by weight (solids) of Printrite ™ 2003, a nonionic polymer.
**Pretreatment Solution 6 contains 10% by weight (solids) of Airflex ™ 4530, {This polymer system behaves as if it is a nonionic polymer as described above.}

Pigmented Inks

Pigmented Inks were used for testing the multivalent pretreatment solution.

Ink Example 1 has the following formulation shown in Table 1. This ink is a white ink that can be printed prior to printing other pigmented ink or at the same time.

TABLE 1

Ink Example 1

| Component | Source | Wt % (based on total weight of Ink) |
|---|---|---|
| Titanium Dioxide Slurry | R-746 | 10.0 (solids) |
| Polymeric Binder | Crosslinked polyurethane PUD EX2 in US20050182154 | 8.0 (solids) |
| Surfactant | Byk-348 (BykChemie) | 0.25 |
| Solvent | Ethylene Glycol | 24.0 |
| Solvent | Glycerol | 12.0 |
| Biocide | Proxel ® GXL (Avecia) | 0.2 |
| Water | | Bal. to 100% |

R-746 is a commercially available titanium dioxide dispersion (E.I. DuPont de Nemours, Wilmington Del.), which is described as a 76.5 wt % (solids) titanium dioxide slurry with a hydrophilic acrylic copolymer as the dispersant. The titanium dioxide used in this slurry is described as being coated with 3% hydrous silica and 1.5-2.0% hydrous alumina, with a mean particle size of about 280 nm.

Where all of the weights are the net weights in the ink. For example, the polymeric binder is available as an emulsion in about a 33% weight percent solution in water. Thus about 24 grams of the polymeric binder emulsion is added to the ink formulation so that 8% polymeric binder is in the final ink.

Ink example 2 is a magenta ink and is based on pigment R122. The formulation is listed in Table 2.

TABLE 2

Magenta Ink Formulation

| Component | Wt % |
|---|---|
| R122 | |
| Glycerol | 15.00 |
| Ethylene Glycol | 8.00 |
| Dowanol ® DPM (Dow Chemical) | 3.00 |
| Surfynol ® 440 | 1.25 |
| 2-Pyrrolidone | |
| Proxel ® GXL (Avecia) | 0.10 |
| Polymeric Binder | 7.00 (solids) |
| Water | Bal. to 100% |

The polymeric binder was a crosslinked polyurethane (PUD EX2) in previously incorporated US20050182154.

Printing Performance

Ink Example 1 was printed with and without Pretreatment Solution 4. The Pretreatment solution was sprayed on the T-shirt in an area about the same as the intended image to be printed. The estimated amount of calcium nitrate on the T-shirt prior to printing was about 5 grams/square meter.

The printing was done using a Fast T-Jet™ from US Screen Printing Institute with a Huffy beefy T-shirt that was used as a dark black T-shirt. The white ink of Ink Example 1 was printed out of three of the seven used printing channels (replacing the light cyan, light magenta and light black), and DuPont™ Artistri™ P5000 CMYK inks were printed out of the other four channels. The image printed was a picture of racing airplanes at the Reno races. The image had an area of a bright red and white nosecone. The color at these two spots was measured. Table 3 shows calorimetric measurements. Table 3 shows Inventive Ink Example Set 1. Entries 5 and 9 are inventive examples and entries 1-4 and 6-8 are Comparative Examples Set 1.

TABLE 3

Colorimetric Measurement for Ink Example 1; Black T-shirt

| | Name | L* | a* | b* | C* | h° | OD | K/S |
|---|---|---|---|---|---|---|---|---|
| 1 | black t-shirt | 16.3627 | 0.2819 | −1.1899 | 1.2228 | 283.327 | 1.721246 | 25.3253 |
| 2 | red nose cone control, no pretreatment, no white ink background | 19.1147 | 1.4444 | 0.5092 | 1.5315 | 19.4208 | 1.609065 | 19.3375 |
| 3 | red nose cone, no pretreatment, white ink background | 21.4612 | 1.9184 | 1.5157 | 2.4449 | 38.3126 | 1.543634 | 16.4968 |
| 4 | red nose cone, pretreatment, no white ink background | 28.2834 | 7.7313 | 7.3719 | 10.6826 | 43.6368 | 1.411168 | 11.906 |

TABLE 3-continued

Colorimetric Measurement for Ink Example 1; Black T-shirt

| | Name | L* | a* | b* | C* | h° | OD | K/S |
|---|---|---|---|---|---|---|---|---|
| 5 | red nose cone, pretreatment and white ink background | 40.043 | 24.4182 | 18.2712 | 30.4973 | 36.8061 | 1.304518 | 9.1054 |
| 6 | white nose cone, no pretreatment, no white background | 23.9974 | −0.924 | −3.9734 | 4.0794 | 256.908 | 1.458421 | 13.3852 |
| 7 | white nose cone, no pretreatment, with white ink background | 28.0427 | −1.3172 | −4.7087 | 4.8894 | 254.372 | 1.341035 | 9.9877 |
| 8 | white nose cone, pretreatment, no white ink background | 70.3828 | −3.1101 | −1.3964 | 3.4092 | 204.179 | 0.613144 | 1.1736 |
| 9 | white nose cone, pretreatment, with white ink background | 77.6686 | −2.4575 | −2.3914 | 3.429 | 224.219 | 0.538501 | 0.8724 |

Entry 1 was the calorimetric measurement of the unprinted T-shirt. Inventive Examples Set 1 Entries 5, and 9 are inventive in that they show the effect of the pretreatment. Comparative Examples Set 1 Entries 2,3, 4, 6.,7 and 8 show the print performance without the pretreatment with the mulitvalent salt. Significantly, enhanced colors are observed when the pretreatment was used.

The t-shirt of entry 9 was subject to several cycles of laundering and it was observed that the image did not fade with the washings.

Inventive Example Set 2 was done using a white T-shirt shown in Table 4. The T-shirt was pretreated by spraying a Pretreatment Solution 4 and printed using the Fast T-Jet™ from US Screen Printing Institute.

TABLE 4

Colorimetric Measurement for Ink Example 1; White T-shirt

| Name | L* | a* | b* | C* | h° | OD | K/S |
|---|---|---|---|---|---|---|---|
| White T-shirt | 95.18 | 3.36 | −13.87 | 14.28 | 283.62 | 0.68 | 1.50 |
| red nose cone | 53.18 | 29.26 | 23.47 | 37.51 | 38.73 | 1.13 | 5.72 |
| White nose cone | 78.79 | −1.58 | −1.17 | 1.97 | 216.42 | 0.70 | 1.62 |

Inventive Example Set 3 was done using the Epson 3000 printer and Black 100% woven cotton tweed. The cotton was pretreated with Pretreatment Solution 4. Ink Example 1 was printed using 4 passes and the DuPont® Artistri® P5000 CK inks in one pass. Blocks of colors were printed and the color properties measured and the results are shown in Table 5.

TABLE 5

Colorimetric Measurements for Ink Example 1; Black Cotton

| | L* | A | B | C | H° | OD | 3A Wash A05 |
|---|---|---|---|---|---|---|---|
| K ink | 28.8139 | −0.1573 | 0.1563 | 0.2218 | 135.1751 | 1.29 | 3.5 |
| C ink | 49.5002 | −15.7895 | −24.9692 | 29.5427 | 237.6924 | 1.08 | 4 |

Comparative Example 3 K a K ink was printed on a unpretreated 419 white cotton and the OD was 1.17 and the wash fastness was 3.5. Comparative Example 3 C, a C ink was printed on a 419 white cotton and the OD was 1.0 and the wash fastness was 2.5. The combination of the pretreatment, the white ink and the pigmented DuPont™ Artistri™ P5000 CK results in superior color and wash fastness.

Ink Example Set 4 compares printing with magenta ink with the 4 different pretreatment formulations. Pretreatment Solutions 1-4 and the Comparative Ink Set 3 were tested with Ink Example 1. The results are shown in Table 6.

TABLE 6

Pretreatment Solutions 1–4; Print Performance

| | L* | a* | b* | C* | h° | Refl. | OD | K/S |
|---|---|---|---|---|---|---|---|---|
| Pretreatment Sol 1 | 57.38 | −2.74 | −4.77 | 5.50 | 240.17 | 18.29 | 0.74 | 1.83 |
| Pretreatment Sol 2 | 64.28 | −2.57 | −5.22 | 5.82 | 243.82 | 22.70 | 0.64 | 1.32 |
| Pretreatment Sol 3 | 73.82 | −3.01 | −3.13 | 4.35 | 226.11 | 27.19 | 0.57 | 0.97 |
| Pretreatment Sol 4 | 77.67 | −2.46 | −2.39 | 3.43 | 224.22 | 28.94 | 0.54 | 0.87 |
| Comparative Sol 1 | 28.04 | −1.32 | −4.71 | 4.89 | 254.37 | 4.56 | 1.34 | 9.99 |

In this test the L* is significantly higher when Pretreatment Solution 1-4 is compared to no pretreatment. The L* improves with increase concentration of the multivalent salt in the pretreatment solutions.

Inventive Example Set 5 Ink Example 2 was printed with and without Pretreatment Solution 4.

TABLE 7

Pretreatment Solution 4 with Ink Example 2

| | L* | a | b | C | H° | OD | 3A Wash-fastness |
|---|---|---|---|---|---|---|---|
| Untreated cotton | 55.65 | 42.94 | 11.45 | 44.44 | 345.07 | 0.88 | 3.00 |
| Treated with Pretreatment Solution 4 cotton | 52.08 | 47.90 | 10.38 | 49.02 | 347.77 | 1.02 | 1.40 |

TABLE 7-continued

Pretreatment Solution 4 with Ink Example 2

|  | L* | a | b | C | H° | OD | 3A Washfastness |
|---|---|---|---|---|---|---|---|
| untreated polycotton | 56.13 | 41.08 | 11.67 | 42.71 | 344.14 | 0.86 | 3.00 |
| Treated with Pretreatment Solution 4 cotton | 49.40 | 47.94 | 9.64 | 48.90 | 348.63 | 1.10 | 0.80 | cotton: 419 available from Testfabrics, West Pittston, PA
polycotton: 7435 from Testfabrics The pretreatment significantly improves the OD for both the polycotton cotton fabrics. The washfastness of this pigmented ink is poorer with pretreatment with multivalent cations.

Inventive Example Set 6. A white t shirt was printed with DuPont® Artistri® P5000 CMY inks. Various combinations of Pretreatment Solution # 5, with and without white ink underprinting were tested. The inventive examples are labeled Inv. Ex 6 cyan, Inv. Ex 6 magenta etc. The comparative examples of this set are similarly labeled, the comparative examples are fully identified with the ink label and the process steps in column 2. The Comparative Example labeled "Pretreated Fused white ink white t-Shirt" were prepared by pretreating with Pretreatment Solution 5, printed with the white ink and then fused at ~170° C. This process is similar to the one described in US2004/0242173 The measurements from the unprinted t-shirt are also reported. in Table 8.

TABLE 8

Printing on White T Shirt: Inventive Example Set 6

|  |  |  | D65/10° L* | a* | b* | C* | h° | OD | Max. K/S |
|---|---|---|---|---|---|---|---|---|---|
| Inv Ex 6 Cyan | Pretreatment, white ink on white T-Shirt | C | 63.21 | 22.71 | 37.66 | 43.98 | 238.90 | 0.91 | 3.17 |
| Inv Ex 6 magenta | Pretreatment, white ink on white T-Shirt | M | 52.74 | 44.26 | −8.60 | 45.08 | 349.01 | 0.96 | 3.58 |
| Inv Ex 6 yellow | Pretreatment, white ink on white T-Shirt | Y | 83.56 | 1.24 | 78.90 | 78.91 | 89.10 | 1.37 | 10.73 |
| unprinted T-Shirt | Std White T-Shirt |  | 96.00 | 2.72 | 12.97 | 13.25 | 281.82 | 0.66 | 1.40 |
| Comp Example 6 Cyan | No Pretreatment with white ink on white T-shirt | C | 65.03 | 19.18 | 30.74 | 36.23 | 238.04 | 0.80 | 2.21 |
| Comp Example 6 Magenta | No Pretreatment with white ink on white T-shirt | M | 55.50 | 41.30 | 16.99 | 44.66 | 337.65 | 0.91 | 3.17 |
| Comp Example 6 Yellow | No Pretreatment with white ink on white T-shirt | Y | 83.80 | −3.52 | 74.23 | 74.31 | 92.71 | 1.11 | 5.55 |
| Comp Example 6 Cyan | Pretreatment no white ink White T-shirt | C | 66.49 | 14.87 | 38.08 | 40.88 | 248.66 | 0.87 | 2.81 |
| Comp Example 6 Magenta | Pretreatment no white ink White T-shirt | M | 55.12 | 44.13 | 15.09 | 46.64 | 341.13 | 0.93 | 3.32 |
| Comp Example 6 Yellow | Pretreatment no white ink White T-shirt | Y | 82.60 | 0.22 | 79.58 | 79.58 | 89.84 | 1.44 | 12.75 |
| Comp Example 6 Cyan | Pretreated Fused white ink white t-Shirt | C | 69.22 | 16.28 | 24.20 | 29.17 | 236.08 | 0.61 | 1.18 |
| Comp Example 6 Magenta | Pretreated Fused white ink white t-Shirt | M | 57.17 | 40.11 | 10.00 | 41.34 | 346.00 | 0.84 | 2.53 |
| Comp Example 6 Yellow | Pretreated Fused white ink white t-Shirt | Y | 88.03 | −4.18 | 42.82 | 43.03 | 95.58 | 0.69 | 1.56 |
| Comp Example 6 Cyan | No Pretreatment No White ink White T-Shirt | C | 66.68 | 13.62 | 36.06 | 38.55 | 249.30 | 0.85 | 2.65 |
| Comp Example 6 Magenta | No Pretreatment No White ink White T-Shirt | M | 51.83 | 42.53 | 13.80 | 44.71 | 342.03 | 0.98 | 3.78 |
| Comp Example 6 Yellow | No Pretreatment No White ink White T-Shirt | Y | 80.48 | −0.40 | 75.56 | 75.56 | 90.30 | 1.26 | 8.09 |

The pretreatment followed by the white underlayer printing is somewhat better when compared to pretreatment without white underlayer and is better than no pretreatment and white underlayer. The pretreatment followed by the white underlayer printing is significantly better than when the white ink underlayer is printed and the it is fused and then it is printed with colored inks—OD for yellow 1.37 vs 0.69, respectively.

Inventive Example Set 7. A black t shirt was printed with DuPont® Artistri® P5000 CMY inks. Various combinations of Pretreatment Solution # 5, with and without white ink underprinting were tested. The inventive examples are labeled Inv. Ex 7 Cyan, Inv. Ex 7 magenta etc. The comparative examples of this set are similarly labeled, the comparative examples are fully identified with the ink label and the process steps in column 2. The Comparative Example labeled "Pretreated Fused white ink black t-Shirt" were prepared by pretreating with Pretreatment Solution 5, printed with the white ink and then fused at ~170° C. This process is similar to the one described in US2004/0242173 The measurements from the unprinted t-shirt are also reported in Table 9.

TABLE 9

Printing on Black T Shirt: Inventive Example Set 7

|  |  |  | D65/10° L* | a* | b* | C* | h° | OD | Max. K/S |
|---|---|---|---|---|---|---|---|---|---|
| Inv Ex 7 Cyan | Pretreated White ink Black T-shirt | C | 48.27 | 16.89 | 29.94 | 34.37 | 240.56 | 1.16 | 6.28 |
| Inv Ex 7 magenta | Pretreated White ink Black T-shirt | M | 39.07 | 37.62 | 10.56 | 39.07 | 344.32 | 1.26 | 8.17 |
| Inv Ex 7 yellow | Pretreated White ink Black T-shirt | Y | 66.27 | −2.86 | 63.64 | 63.70 | 92.58 | 1.40 | 11.49 |
| unprinted T-Shirt | Std Black T-Shirt |  | 16.91 | −0.59 | −0.55 | 0.81 | 223.09 | 1.71 | 24.39 |
| Comp Example 7 Cyan | No Pretreatment White ink black T-shirt | C | 18.35 | −1.80 | −5.88 | 6.15 | 253.02 | 1.69 | 23.28 |
| Comp Example 7 Magenta | No Pretreatment White ink black T-shirt | M | 18.92 | 4.74 | −3.67 | 6.00 | 322.30 | 1.62 | 19.93 |
| Comp Example 7 Yellow | No Pretreatment White ink black T-shirt | Y | 21.89 | −3.40 | 4.75 | 5.84 | 125.58 | 1.59 | 18.62 |
| Comp Example 7 Cyan | Pretreated No white ink Black t-Shirt | C | 15.59 | −0.81 | −3.76 | 3.85 | 257.88 | 1.78 | 28.95 |
| Comp Example 7 Magenta | Pretreated No white ink Black t-Shirt | M | 17.79 | 5.20 | −0.36 | 5.21 | 356.08 | 1.67 | 22.60 |
| Comp Example 7 Yellow | Pretreated No white ink Black t-Shirt | Y | 26.49 | −8.37 | 10.06 | 13.09 | 129.77 | 1.67 | 22.27 |
| Comp Example 7 Cyan | Pretreated Fused white ink black T-Shirt | C | 58.30 | −6.47 | 13.40 | 14.88 | 244.23 | 0.69 | 1.55 |
| Comp Example 7 Magenta | Pretreated Fused white ink black T-Shirt | M | 50.97 | 19.99 | 11.81 | 23.21 | 329.43 | 0.84 | 2.57 |
| Comp Example 7 Yellow | Pretreated Fused white ink black T-Shirt | Y | 69.71 | −7.30 | 19.09 | 20.43 | 110.92 | 0.76 | 1.99 |

The inventive examples have significantly improved Chroma and L* relative to the comparative examples.

Inventive Example Set 8 shows the time delay between printing the white ink underprint layer and the colored inks on top. Pretreatment Solution # 5 was used for these tests. The time delay was measured at the start of the printing of the white ink and the printing of the colored inks. The fused printed t shirt was fused after it was printed with the white underlayer at ~170° C.

TABLE 10

Time delay between printing white underprint layer and colored inks.

| Name | L* | A* | b* | C* | h° | OD | K/S |
|---|---|---|---|---|---|---|---|
| 4 min C | 52.632 | −17.955 | −31.241 | 36.033 | 240.112 | 1.070 | 4.911 |
| 10 min C | 52.041 | −16.981 | −28.958 | 33.570 | 239.612 | 1.051 | 4.663 |
| 45 min C | 52.539 | −14.994 | −24.820 | 28.997 | 238.864 | 0.977 | 3.797 |
| 90 min C | 52.458 | −15.638 | −23.992 | 28.639 | 236.903 | 0.981 | 3.842 |
| Fused White C | 58.300 | −6.468 | −13.397 | 14.876 | 244.228 | 0.691 | 1.554 |
| 4 min M | 41.392 | 38.581 | −11.263 | 40.191 | 343.727 | 1.208 | 7.109 |
| 10 min M | 40.791 | 35.932 | −11.575 | 37.751 | 342.144 | 1.201 | 6.981 |
| 45 min M | 39.965 | 33.614 | −11.717 | 35.598 | 340.783 | 1.205 | 7.044 |

TABLE 10-continued

Time delay between printing white underprint layer and colored inks.

| Name | L* | A* | b* | C* | h° | OD | K/S |
|---|---|---|---|---|---|---|---|
| 90 min M | 41.452 | 31.377 | −12.330 | 33.713 | 338.548 | 1.143 | 5.980 |

TABLE 10-continued

Time delay between printing white underprint layer and colored inks.

| Name | L* | A* | b* | C* | h° | OD | K/S |
|---|---|---|---|---|---|---|---|
| Fused White M | 50.970 | 19.988 | −11.805 | 23.213 | 329.433 | 0.845 | 2.570 |
| 4 min Y | 67.244 | −4.900 | 61.848 | 62.042 | 94.530 | 1.342 | 10.012 |
| 10 min Y | 67.991 | −5.601 | 60.406 | 60.665 | 95.297 | 1.310 | 9.229 |
| 45 min Y | 64.004 | −5.890 | 55.576 | 55.887 | 96.050 | 1.328 | 9.662 |
| 90 min Y | 65.339 | −6.950 | 56.130 | 56.559 | 97.059 | 1.304 | 9.085 |
| Fused White Y | 69.711 | −7.296 | 19.087 | 20.434 | 110.919 | 0.763 | 1.986 |

When the colored areas are viewed for the fused white versus the color printing being done in less 90 minutes there is a dramatically better color with the inventive sequence of pretreatment, printing white underlay, printing colored inks in less than 60 minutes after the white inks. The time delay between printing the white ink and the colored inks of 90 minutes begins to show some degradation of color quality.

Inventive Example 9 Set shows the difference in the whiteness of various printing intensities of the white ink. Pretreatment Solution #5 was used as the pretreatment for each of the printed samples. A US Screen printing T-Jet printer was used to print these T-shirts and had the white ink and pigmented inks used above in its various printheads. Three white ink printheads put down 100% coverage in a first pass, followed within in less than 3 minutes by printing a colored image of cartoon characters which was an oval colored printed area with a white rectangular background which is larger than the colored image. The image had areas of white in it and the printer also printed white ink essentially simultaneously. The entries show color measurements for an unprinted black T-shirt, a white T-shirt, the white underlayer printed at 720 dpi, a white printed layer measured at one of the white areas of the cartoon image over the 720 dpi underlayer, and a 1440 dpi underlayer.

TABLE 11

White ink printing on black textiles.

| % Reflectance | D65/10° L* | a* | b* | C* | h° | OD | Max. K/S |
|---|---|---|---|---|---|---|---|
| Black Hanes T | 17.623 | −0.737 | −0.542 | 0.915 | 216.345 | 1.684 | 23.165 |
| White base only at 720 dpi Black Hanes T | 71.425 | −1.932 | −5.056 | 5.413 | 249.086 | 0.555 | 0.933 |
| After color print over white underlayer of 720 dpi Black Hanes T, measured at solid white parts of the image; additonal white printed during color printing | 76.915 | −1.927 | −3.865 | 4.319 | 243.498 | 0.514 | 0.786 |
| White base only at 1440 dpi 1 pass Black Hanes T | 82.604 | −2.016 | −3.724 | 4.234 | 241.571 | 0.466 | 0.632 |
| White Hanes T | 95.857 | 2.659 | −12.455 | 12.736 | 282.049 | 0.648 | 1.337 |

The white T-shirt with an L* of 95.867 suggests this is an opaque white—a reflectance of "all" light. The Black T L* is only 17.623. The amount of whiteness for the 720 dpi, and the 1440 dpi underlayer have increasing L* showing an increase to a white layer. The white printed areas of the cartoon image printed onto the 720 dpi underlayer, were also measured and the whitest areas measured. The L* increased from 71.4 to 76.9 showing the significant incremental effect of printing a white ink essentially simultaneously with the colored inks.

The white area for the 720 and 1440 dpi measurements were made in the white rectangular background for the T-shirt. However, when compared to the white T-shirt, the printed white layer on the Black T cannot be considered an opaque layer.

Inventive Example 10 was carried out by printing on a 419 black cotton textile with the white ink described above and a set of reactive dyes, which were the R700 Reactive Dyes for the DuPont™ Artistri™ printer. Prior to printing the black cotton was treated with Pretreatment Solution 5. In the first rail of the DuPont™ Artistri™ 2020 printer ⅘ of the printheads were supplied with the white ink described above and the second rail had eight dyes chosen from the 8 available dyes. After printing the textile was heat fused. A decorative pattern was done on the black textile. When the white ink was not used as a underprint for the image, the reactive dye image was barely visible. When the white ink was used the pattern faithfully reproduced the image to be printed, and when viewed prior to printing the colored image the white intensities were varied by using a grayscale printing strategy. The white was used in a nonuniform print pattern to optimize the reactive dye image.

The invention claimed is:

1. A method of digitally printing a colored image on a textile comprising the steps of:
    (a) pretreating the textile with a pretreatment solution consisting of an aqueous multivalent cationic salt solution,
    (b) digitally printing the pretreated textile with an aqueous white pigmented ink jet ink in at least a portion of the area of the printed colored image to be applied thereover, where the white printed area is substantially the same shape as the printed colored image to be applied thereover, and the amount of white ink used to print the white printed area is not uniform and varies in intensity from greater than 0% to 100% to provide a white underlayer that is not a uniform opaque masking layer,
    c) digitally printing the colored image on the white ink using one or more aqueous colored ink jet inks;
    where the time interval between the printing of the white ink and printing of the colored image is less than 10 minutes,
    where the white printed area is not cured or dried before the colored image is printed and the one or more aqueous colored inkjet inks is printed on the white printed area in a wet-on printing process.

2. The method of claim 1, where the textile is a colored textile.

3. The method of claim 2, where the textile is a dark textile.

4. The method of claim 1, where the pretreated textile is dried prior to printing with the white ink.

5. The method of claim 1, where the textile with the printed colored image is post treated.

6. The method of claim 1, wherein the multivalent cation is selected from one or more of the group of multivalent cations of elements Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn and Pb.

7. The method of claim 6, wherein the multivalent cation is calcium.

8. The method of claim 1, wherein the pretreatment solution comprises a solution of a multivalent cationic salt in water, wherein the multivalent cationic salt is selected from the group consisting of calcium nitrate, calcium nitrate hydrate and mixtures thereof.

9. The method of claim 1, wherein the colored inkjet inks are pigmented inkjet inks.

10. The method of claim 1, wherein the textile is printed with the white pigmented ink to an ink coverage of between about 5 to about 300 grams of ink per square meter of textile.

11. The method of claim 9, wherein the textile is printed with pigmented inkjet inks of a pigmented inkjet ink set, wherein the pigmented inkjet ink set comprises at least two differently colored pigmented inkjet inks, where at least one of the pigmented inks is a white ink.

12. The method of claim 11, wherein the pigmented ink set comprises at least three differently colored pigmented inkjet inks, wherein at least one is a cyan pigmented inkjet ink, at least one is a magenta pigmented inkjet ink, and at least one is a yellow pigmented inkjet ink, and a white ink.

13. The method of c aim 12, wherein the pigmented ink set further comprises a black pigmented inkjet ink.

14. The method of claim 1, wherein the textile is a T-shirt.

15. The method of claim 14, where the T-shirt is a dark colored T-shirt.

16. A method of digitally printing a colored image on a textile comprising the steps of:
(a) pretreating the textile with a pretreatment solution consisting of an aqueous multivalent cationic salt solution and a nonionic latex polymer,
(b) digitally printing the pretreated textile with an aqueous white pigmented ink jet ink in at least a portion of the area of the printed colored image to be applied thereover,
where the white printed area is substantially the same shape as the printed colored image to be applied thereover, and the amount of white ink used to print the white printed area is not uniform and varies in intensity from greater than 0% to 100% to provide a white underlayer that is not a uniform opaque masking layer,
c) digitally printing the colored image on the white ink using one or more aqueous colored ink jet inks;
where the time interval between the printing of the white ink and the printing of the colored image is less than 10 minutes,
where the white printed area is not cured or dried before the colored image is printed and the one or more aqueous colored inkjet inks is printed on the white printed area in a wet-on-wet printing process.

17. The method of claim 16, where the nonionic latex polymer is selected from the group consisting of an acrylic polymer and a urethane polymer with polyether functionality.

18. The method of claim 16 where the textile is a colored textile.

19. The method of claim 18, where the textile is a dark textile.

20. The method of claim 16, where the pretreated textile is dried prior to printing with the white ink.

21. The method of claim 16, where the textile with the printed color image is post treated.

22. The method of claim 16, where the multivalent cation is calcium.

23. The method of claim 16, wherein the colored inkjet inks are pigmented inkjet inks.

24. The method of claim 1, wherein the white pigmented ink comprises nano $TiO_2$.

25. The method of claim 14, wherein the white pigmented ink also comprises pigmentary $TiO_2$.

26. The method of claim 16, wherein the white pigmented ink comprises nano $TiO_2$.

27. The method of claim 26, wherein the white pigmented ink also comprises pigmentary $TiO_2$.

* * * * *